United States Patent [19]

Stüve

[11] Patent Number: 5,071,261

[45] Date of Patent: Dec. 10, 1991

[54] EARTHQUAKE-BEARING

[75] Inventor: Günther Stüve, Hamburg, Fed. Rep. of Germany

[73] Assignee: New-York Hamberger Gummi-Waaren Compagnie AG, Fed. Rep. of Germany

[21] Appl. No.: 622,657

[22] Filed: Dec. 5, 1990

[30] Foreign Application Priority Data

Dec. 18, 1989 [DE] Fed. Rep. of Germany ....... 3941778

[51] Int. Cl.$^5$ ..................... F16C 27/00; E01D 19/06; E04H 9/02
[52] U.S. Cl. ........................................ 384/36; 14/73.5; 52/167 R; 384/49
[58] Field of Search ..................... 384/36, 49; 14/16.1; 52/167

[56] References Cited

U.S. PATENT DOCUMENTS

| 2,014,643 | 9/1935 | Bakker | 384/49 |
| 2,035,143 | 3/1936 | Cavaglieri | 52/167 |
| 3,329,472 | 7/1967 | Donnellan et al. | 14/16.1 X |
| 3,771,270 | 11/1973 | Byers | 52/167 |
| 3,971,598 | 7/1976 | Rudge | 384/36 |
| 3,998,499 | 12/1976 | Chiarotto | 384/36 |
| 4,033,005 | 7/1977 | Czernik et al. | 14/16.1 |
| 4,517,778 | 5/1985 | Nicolai | 384/49 X |
| 4,726,161 | 2/1988 | Yaghoubian | 384/49 X |

FOREIGN PATENT DOCUMENTS 3408591 10/1985 Fed. Rep. of Germany .

Primary Examiner—Thomas R. Hannon
Attorney, Agent, or Firm—Lowe, Price, LeBlanc & Becker

[57] ABSTRACT

An earthquake bearing with a spherical ball (26) located between two elastomer layers (18,19) in the shape of half-shells. The elastomer layers each include a cylindrical elastomeric pad. The earthquake bearing further includes a spherical clearance (25) facing the ball (26), with bearing housings or halves (11,12) being mutually braced by elastomer bearings (24) in order to achieve compliant, progressive damping. This system is capable of gently moving out of the way both vertically and horizontally. The bearing halves (11,12) are prestressed by tension bars (23) which pass centrally through the bearings (24). The elastomer bearings (24) include of a plurality of columns defined by panes of elastomers and panes of steel. Outwardly directed head bolts (15) are held on the base plates (13,14) of the bearing housings (11,12) and are anchored into the adjoining components.

11 Claims, 3 Drawing Sheets

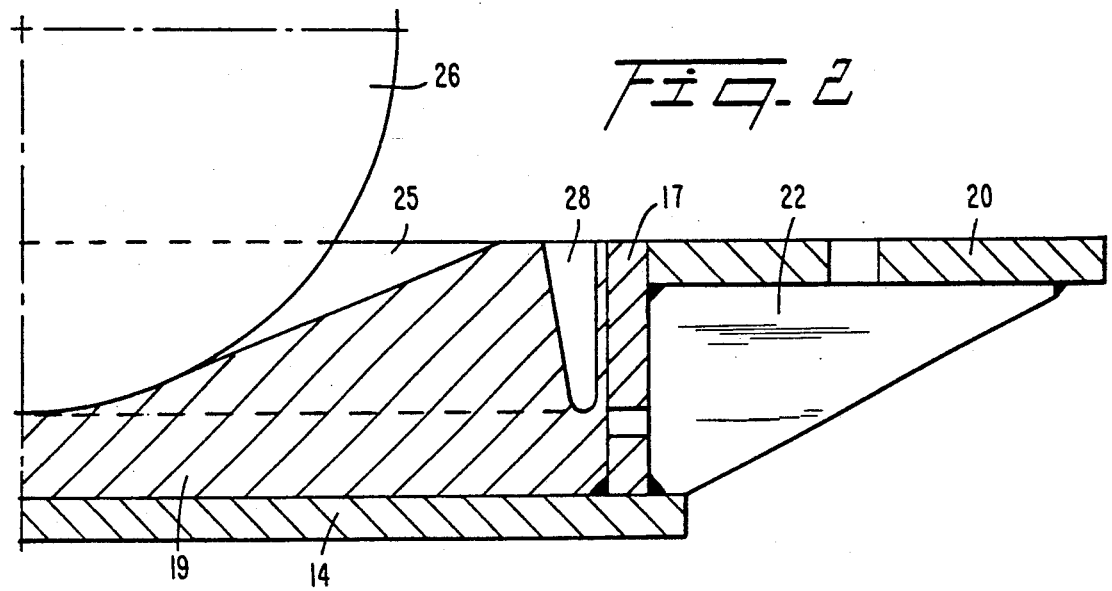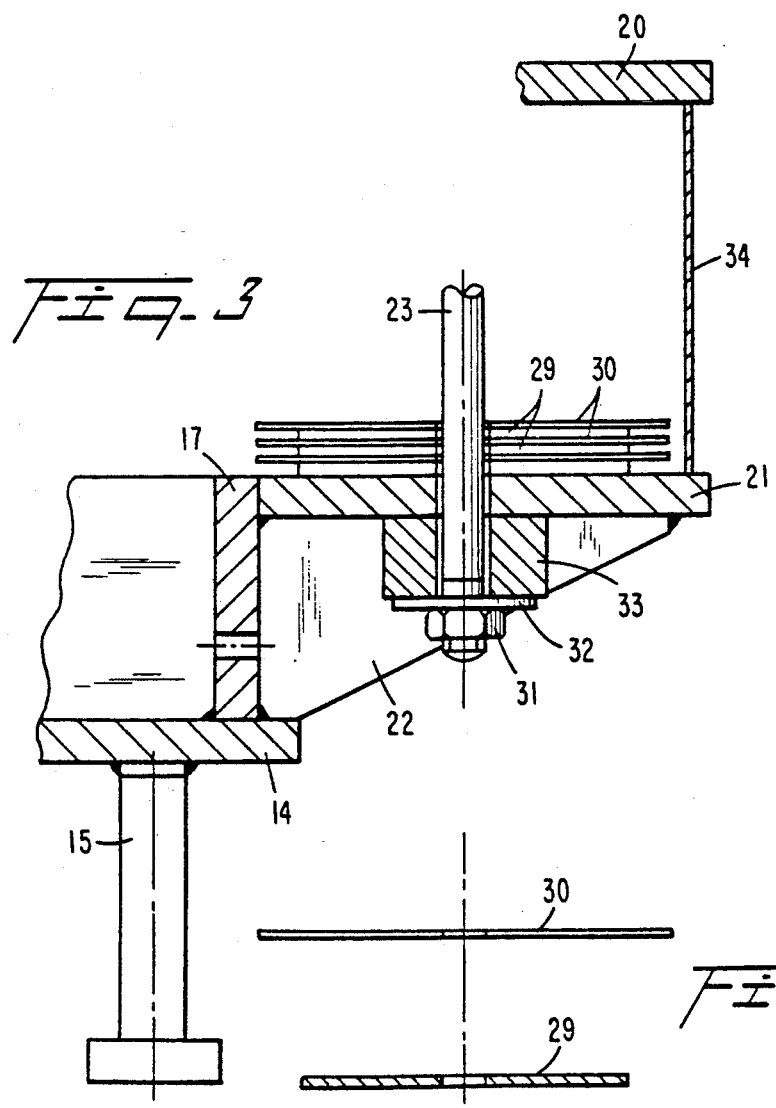

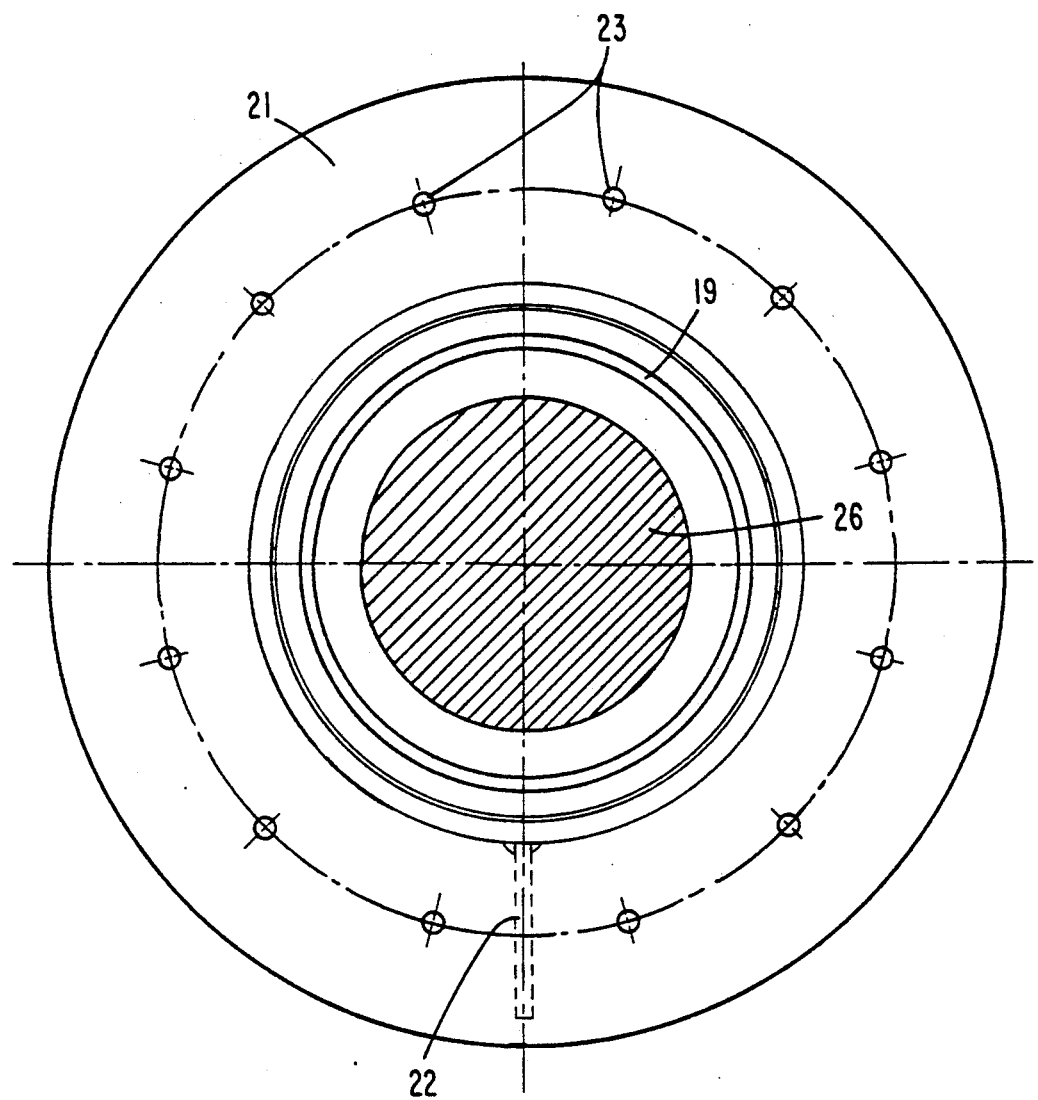

5,071,261

EARTHQUAKE-BEARING

TECHNICAL FIELD

The invention relates to bearings and, more particularly, an earthquake bearing with a spherical core held between elastomer layers in the form of semispherical shells mounted in a steel housing.

BACKGROUND ART

Such a damper or shock-absorber bearing is known from German Offenlegungsschrift 34 08 591. In this bearing, connection components consisting of a brittle material such as concrete or ceramic, are provided between two bearing halves. When there is minor horizontal displacement, these connecting components burst. Accordingly, the dynamic shock absorption is comparatively slight.

SUMMARY OF THE INVENTION

An object of the present invention is to create a compact earthquake bearing assuring compliant, progressive damping both in the vertical and in the horizontal directions.

Progressive damping is provided by an earthquake bearing of the invention comprising a spherical core held between two elastomer layers shaped as half shells held within a housing. The elastomer layers comprise a cylindrical elastomeric pad with a spherical clearance facing the core. The radius of the clearance is at least twice that of the core, and the housing preferably includes plural bearing housings mutually braced to each other. By means of this design the system is able to gently move out of the way in the presence of earthquake shocks. The elastomeric core or ball support provides especially compliant, progressive damping along the horizontal. The damping compliance can be arbitrarily matched or adjusted. This is achieved by means of the shore hardness of the elastomer, the radius of curvature of the spherical clearances in the elastomeric pads and the ball diameter.

In a preferred embodiment of the earthquake bearing of the invention, the elastomer bearing comprises a plurality of columns formed by layers of elastomer panes and steel panes. The steel panes assure adequate dimensional stability whereas the elastomer panes permit damped deflection. Appropriately, the bearing halves are prestressed by tension bars passing centrally through the columns.

The two bearing halves are substantially identical and each comprises a circular base plate, a tubular axial flange and an annular flange around the periphery of the axial flange. Preferably, the annular flange is supported at equal intervals by radially directed ribs. As a result, stable receiving spaces for the elastomeric pads are provided, the two bearing halves where called for being tightened to one another by means of the external annular flanges.

Head-bolts pointing outward are mounted to the base plates and serve to anchor the bearing to the adjoining components. The tension bars pass through the radial flange and can be tightened by nuts, cup springs being mounted between nut and radial flange.

Advantageously, a sleeve enclosing the elastomer bearing is present between the radial flanges to protect the kinematic system against soiling. Advantageously, each elastomeric pad comprises a peripheral V-groove extending near the edge region and with a width substantially corresponding to that of the spherical clearance. The damping behavior of the bearing can be further matched to the ideal case by suitably selecting the width and depth of the groove.

The columns also may be replaced by annular elastomer rings, whereby the load capacity of the bearing is increased.

Further advantages, particulars and features of the invention are stated in the discussion below of a preferred embodiment mode of the earthquake bearing of the invention in relation to the attached drawings.

BRIEF DESCRIPTION OF THE DRAWING

FIG. 2 is an enlarged partial section view of the bearing housing with inserted elastomeric pad;

FIG. 3 is an enlarged vertical section of an elastomer bearing with a tension bar passing through it;

FIG. 3A is an enlarged sectional view depicting alternating panes; and

FIG. 4 is a horizontal section of the bearing of FIG. 1.

DETAILED DESCRIPTION OF THE DRAWING

Figure 1:
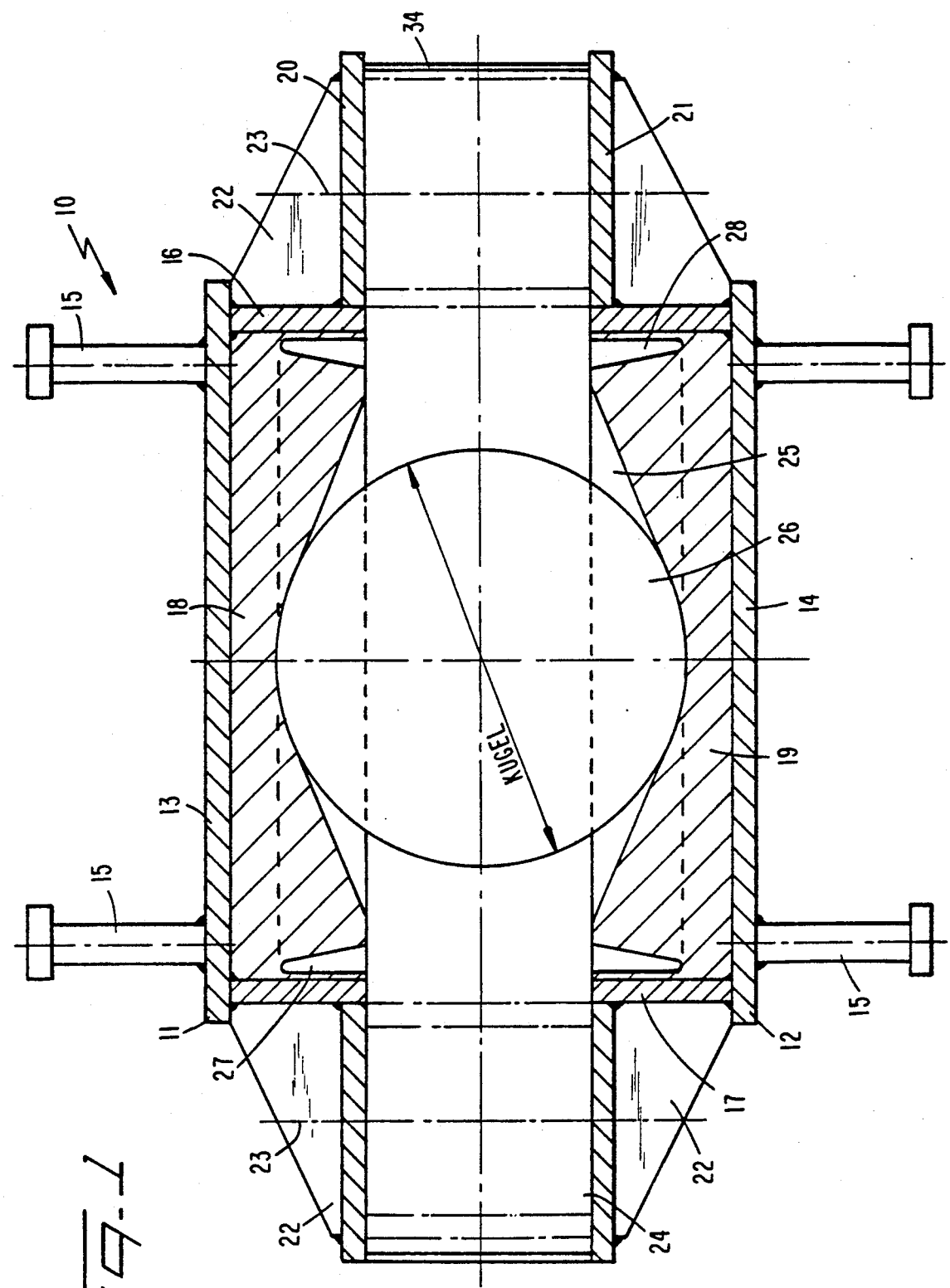
FIG. 1 is a vertical cross-section taken through the earthquake bearing of the invention.

Earthquake bearing 10 in FIG. 1 comprises an upper bearing housing 11 and a lower bearing housing 12, essentially both of the same design, each respectively including base plates 13 and 14 which are circular steel plates to the outside of which head bolts 15 are welded to anchor the bearing 10 into the adjoining components.

Tubular axial flanges 16 and 17 are welded along the periphery of the base plates 13 and 14, respectively, and form a receiving space for an elastomeric pad 18 and 19. Circumferential radial flanges 20 and 21 are respectively welded to the axially inner ends of the flanges 16 and 17. To increase stability and load bearing capacity, node-forming metal plates or ribs 22 are welded at regular intervals to the axial flanges 16 and 17 and to the radial flanges 20 and 21, respectively. As a result, a dimensionally stable housing is achieved. Tension bars 23 are merely indicated schematically by their center lines in FIG. 1. Elastomer bearings 24—the design of which is described below—are merely shown schematically in FIG. 1.

As shown by FIGS. 1 and 2, an elastomeric pad 18 and 19 is disposed inside the space subtended by the axial flange 16 and 17, respectively. Each elastomeric pad 18,19 essentially includes a cylindrical, elastomeric body with an inward, central and spherical clearance 25. The ball 26 rests inside this clearance 25. The ball may be steel, aluminum, synthetic resin or hard rubber.

The two elastomeric pads 18 and 19 comprise a peripheral V-shaped groove 27 and 28, respectively, on their inside and at the edge. The depth of the groove 27 and 28 matches approximately the depth of the clearance 25. By controlling the depth and the width of the groove, the bearing damping coefficient may be set. Similar considerations apply to the radius of curvature of the clearance 25 which as a rule shall be essentially twice the radius of the ball 26. The damping coefficient is controlled besides the shape of the groove 27, 28 also by the radius of curvature of the clearance 25 and the ball diameter, and by the shore hardness of the elastomeric pad 18, 19. By matching these magnitudes, the bearing can be made suitable for different applications.

The construction of the elastomer bearing 24 is shown in FIG. 3. Elastomer panes 29 alternate in superposition with steel panes 30—also shown in FIG. 3 and 3A in cross-section and in detail—between the peripheral annular flanges 20 and 21 of the upper and lower bearing housing 11 and 12, respectively. The elastomer bearings 24 formed by the superposition of the panes 29 and 30 assume the support function in the zone of the peripheral annular flanges 20 and 21, up to approximately twelve such equidistant elastomer bearings 24 being possible. The bearings are always prestressed by tension bars 23 comprising a threaded segment at their ends. A nut 31 is screwed on the threaded segment and rests by means of a washer 32 and a cup spring 33 against the annular flange 21. The bearing halves may be prestressed by about 5-15 mm.

The kinematic system is protected by a tubular sleeve 34 of special-steel sheetmetal or plate peripherally present between the annular flanges 20 and 21.

The vertical building load is transmitted through the head bolts 15 or the base plate 13, the axial flange 16, the radial flange 20, the elastomer bearing 24 with the panes 29 and 30, the annular flange 21, the axial flange 17 and the base plate 14 or the head bolt 15 into the foundation. The comparatively stiff elastomer bearings 24 with the cup springs 33 and the tension bars 23, as well as the ball 26 with the prestressed elastomeric pads 18 and 19, and the sleeve 34, damp horizontal vibrations caused by ordinary winds. The system will shift vertically and horizontally only upon earthquake shocks.

Accordingly an earthquake bearing has been created that makes possible progressive and compliant damping in both horizontal and vertical directions.

It is emphasized here again that the above description is merely illustrative and that a variety of modifications and changes are feasible without thereby transcending the scope of the invention. For instance the elastomer bearings 24 may be replaced by a single annular bearing stratified by means of annular panes of steel and elastomer and located between the annular flanges 20 and 21. Higher loads can thus be transmitted.

I claim:

1. An earthquake bearing comprising a housing; a pair of elastomer layers in the shape of half shells and disposed in the housing; and a spherical ball held between the elastomer layers; wherein the elastomer layers each include a generally cylindrical elastomeric pad (18,19) with a spherical clearance (25) facing the ball (26) and with a radius at least twice that of the ball, said housing being a pair of bearing housings (11,12) mutually supported by means of elastomer bearings (24).

2. Earthquake bearing defined in claim 1, wherein the elastomer bearing comprises a plurality of columns (24) which are formed by stacking interleaved elastomer panes (29) and steel panes (30) between the housings.

3. Earthquake bearing defined in claim 2, wherein the bearing housings define bearing halves (11,12) which are prestressed by means of tension bars (23) passing centrally through the columns (24).

4. Earthquake bearing defined in claim 3, wherein the bearing housings (11,12) each include an essentially circular base plate (13,14), a tubular axial flange (16,17) extending therefrom and a radially directed annular flange (20,21) connected to the periphery of said axial flange (16,17).

5. Earthquake bearing defined in claim 4, wherein the annular flange (20,21) is supported at regular intervals by radially directed ribs.

6. Earthquake bearing defined in claim 4, further comprising outwardly pointing head bolts (15) affixed to the base plates (13, 14).

7. Earthquake bearing defined in claim 4, wherein the tension bars (23) pass through the radial flange (20,21) for tightening by means of nuts (31) and cup springs (33) resting against the radial flange (21).

8. Earthquake bearing defined in claim 7, further comprising a tubular sleeve (34) between the radial flanges (20,21) to enclose the elastomer bearings (24).

9. Earthquake bearing defined in claim 8, wherein the elastomeric pads (18,19) each include a peripheral, essentially V-shaped groove (27,28) at the edges.

10. Earthquake bearing defined in claim 9, wherein the depth of the groove (27,28) essentially corresponds to the depth of the spherical clearance (25).

11. Earthquake bearing defined in claim 1, wherein the elastomer bearing includes annular panes of elastomers and annular panes of steel mounted between annular flanges (20,21) of the housing.

* * * * *